United States Patent
Gong et al.

(10) Patent No.: US 12,249,170 B2
(45) Date of Patent: Mar. 11, 2025

(54) VISION-BASED DOCUMENT LANGUAGE IDENTIFICATION BY JOINT SUPERVISION

(71) Applicant: Oracle International Corporation, Redwood Shores, CA (US)

(72) Inventors: Liyu Gong, Austin, TX (US); Yuying Wang, Seattle, WA (US); Zhonghai Deng, Redmond, WA (US); Iman Zadeh, Los Angeles, CA (US); Jun Qian, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 17/897,055

(22) Filed: Aug. 26, 2022

(65) Prior Publication Data
US 2023/0067033 A1    Mar. 2, 2023

Related U.S. Application Data

(60) Provisional application No. 63/238,009, filed on Aug. 27, 2021.

(51) Int. Cl.
*G06F 40/263* (2020.01)
*G06V 10/82* (2022.01)
*G06V 30/246* (2022.01)

(52) U.S. Cl.
CPC .......... *G06V 30/246* (2022.01); *G06F 40/263* (2020.01); *G06V 10/82* (2022.01)

(58) Field of Classification Search
CPC ..... G06V 30/246; G06V 10/82; G06F 40/263
See application file for complete search history.

(56) References Cited

U.S. PATENT DOCUMENTS

| 12,032,907 B2 * | 7/2024 | Pouran Ben Veyseh .................... G06F 40/279 |
| 2015/0269135 A1 * | 9/2015 | Kim ...................... G06F 40/157 704/8 |
| 2017/0004374 A1 | 1/2017 | Osindero |
| 2018/0067918 A1 * | 3/2018 | Bellegarda .............. G10L 25/30 |

(Continued)

FOREIGN PATENT DOCUMENTS

WO    2021161095 A1    8/2021

OTHER PUBLICATIONS

International Application No. PCT/US2022/075543, International Preliminary Report on Patentability mailed on Mar. 7, 2024, 8 pages.

(Continued)

*Primary Examiner* — Abul K Azad
(74) *Attorney, Agent, or Firm* — Kilpatrick Townsend & Stockton LLP

(57) ABSTRACT

The present embodiments relate to a language identification system for predicting a language and text content of text lines in an image-based document. The language identification system uses a trainable neural network model that integrates multiple neural network models in a single unified end-to-end trainable architecture. A CNN and an RNN of the model can process text lines and derive visual and contextual features of the text lines. The derived features can be used to predict a language and text content for the text line. The CNN and the RNN can be jointly trained by determining losses based on the predicted language and content and corresponding language labels and text labels for each text line.

20 Claims, 11 Drawing Sheets

(56) References Cited

U.S. PATENT DOCUMENTS

2018/0101726 A1* 4/2018 Wang .................. G06V 30/414
2023/0066922 A1   3/2023 Gong et al.

OTHER PUBLICATIONS

International Application No. PCT/US2022/075543, International Search Report and Written Opinion mailed on Dec. 9, 2022, 11 pages.

* cited by examiner

VISION-BASED DOCUMENT LANGUAGE IDENTIFICATION BY JOINT SUPERVISION

CROSS-REFERENCE TO RELATED APPLICATIONS

This application claims priority to U.S. Provisional Patent Application No. 63/238,009, filed Aug. 27, 2021, the entirety of which is incorporated by reference herein.

BACKGROUND

Identifying the language of a document is crucial for many document analysis systems and applications. These documents can include either text-based documents or image-based (e.g., scanned or imaged) documents. Text-based documents are computer files that contain native character (e.g., Unicode) sequences. On the other hand, image-based documents (e.g., documents that are electronically scanned using a scanner) are made up of collections of image pixels and text content and characters are represented by pixels and pixel values. Identifying or classifying the languages from image-based documents is very challenging.

SUMMARY

The present disclosure relates to language identification techniques, and more particularly to using machine learning based techniques for automatically identifying languages in image-based documents. Various embodiments are described herein, including methods, systems, non-transitory computer-readable storage media storing programs, code, or instructions executable by one or more processors, and the like.

A first example embodiment relates to a method for predicting a language included in text lines of an image-based document using a model. The method can include receiving an image-based document including multiple text lines. The method can also include executing, for each text line included in the image-based document, a model to perform a language prediction process.

Executing the model can include processing the text line using a convolutional neural network (CNN) to derive visual features from the text line. Executing the model can also include processing the visual features using a recurrent neural network (RNN) to extract contextual features of the text line. Executing the model can also include predicting, using a language prediction module, a predicted language of the text line by processing the contextual features of the text line. Executing the model can also include deriving a language prediction loss based on a comparison between the predicted language and a known language of the text line. During training, executing the model can also include predicting, using a text prediction module, a predicted set of text for the text line. Executing the model can also include deriving a text prediction loss based on a difference between the predicted set of text for the text line and known text for the text line. The language prediction loss and the text predicted loss can be used for training the model.

Another example embodiment relates to a cloud infrastructure node. The cloud infrastructure node can include a processor and a non-transitory computer-readable medium. The-transitory computer-readable medium includes instructions that, when executed by the processor, cause the processor to receive an image-based document including multiple text lines. The processor can further be configured to perform a text localization process to identify each of the multiple text lines in the image-based document. Each of the multiple text lines can be bounded by a bounding box specifying a position of each of the multiple text lines in the image-based document.

The processor can further be configured to process each text line of the multiple text lines using a convolutional neural network (CNN) of a model to derive visual features from the text line. The processor can further be configured to process the derived visual features using a recurrent neural network (RNN) of the model to extract contextual features of each text line. The processor can further be configured to predict, using a language prediction module of the model, a predicted language of each text line by processing the contextual features of the text line. The processor can further be configured to aggregate predicted languages for each of the multiple text lines. The processor can further be configured to derive, based on the aggregated predicted languages, a predicted language for the image-based document.

Another example embodiment relates to a non-transitory computer-readable medium. The non-transitory computer-readable medium can include stored thereon a sequence of instructions which, when executed by a processor causes the processor to execute a process. The process can include receiving an image-based document including multiple text lines. The process can also include executing, for each text line included in the image-based document, a model to perform a language and text prediction process.

Executing the model can include processing the text line using a convolutional neural network (CNN) to derive visual features from the text line. Executing the model can also include processing the visual features using a recurrent neural network (RNN) to extract contextual features of the text line. Executing the model can also include predicting, using a language prediction module, a predicted language of the text line by processing the contextual features of the text line. Executing the model can also include deriving a cross-entropy (CE) loss based on a comparison between the predicted language and a known language of the text line. Executing the model can also include predicting, using a text prediction module, a predicted set of text for the text line. Executing the model can also include deriving a connectionist temporal classification (CTC) loss based on a difference between the predicted set of text for the text line and known text for the text line.

DETAILED DESCRIPTION

Figure 1:
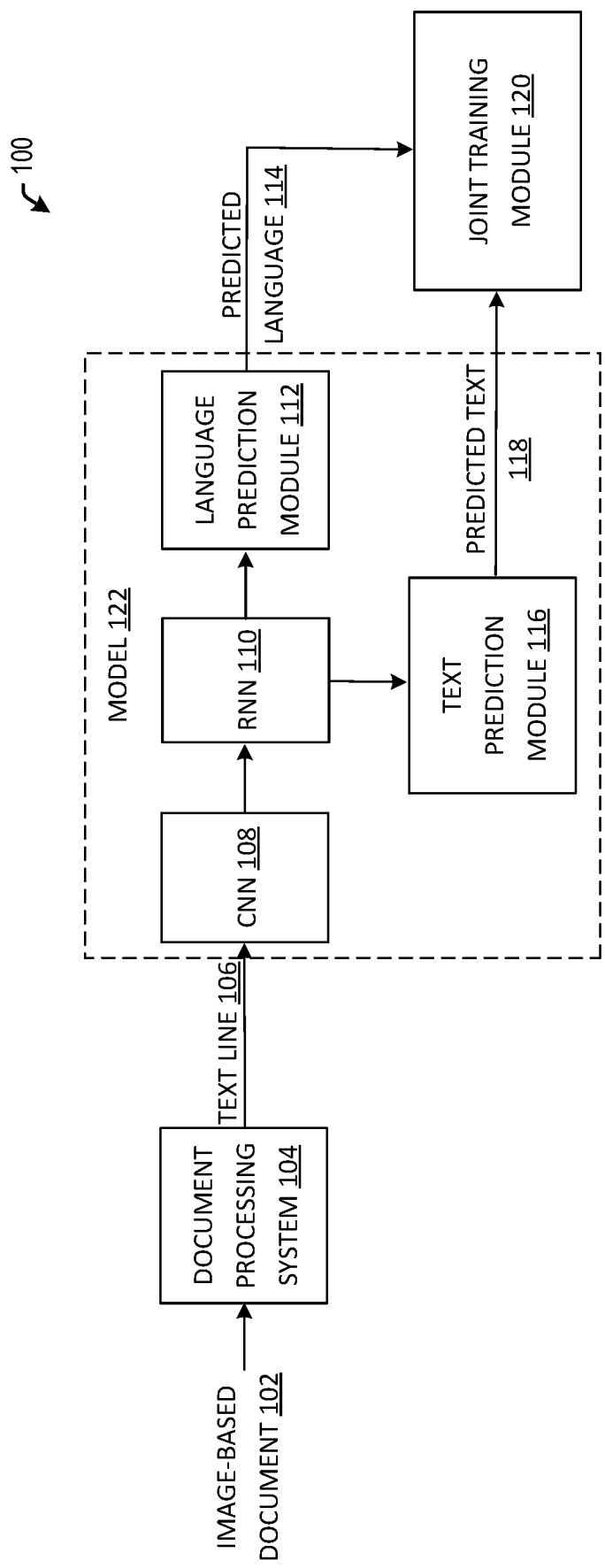
FIG. 1 is block diagram illustrating an example unified end-to-end trainable architecture, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present embodiments relate to language identification techniques, and more particularly, to using machine learning based techniques for automatically identifying languages in image-based documents. Various embodiments are described herein, including methods, systems, non-transitory computer-readable storage media storing programs, code, or instructions executable by one or more processors, and the like.

In certain embodiments, a language identification system is described that provides an end-to-end deep learning-based technique for automatic language identification for image-based documents. The language identification s facilitated using an integrated ML model that combines multiple neural networks. In certain implementations, the ML model integrates a convolutional neural network (CNN) and a recurrent neural network (RNN). The techniques described herein may be implemented using one or computer systems. In certain implementations, the language identification functions described herein can be implemented in a cloud environment and the functions provided as cloud services.

Language identification (LI) refers to the task of determining the natural or primary language for a document based upon the contents of the document. A document can be written in a single language or could have multiple languages in different parts of the document. In cases where a document has multiple languages, LI techniques may be used to determine the primary (or predominant) language of the document, and sometimes, additionally, the secondary, tertiary, etc. languages of the document.

A document whose contents are to be analyzed to determine the language of the document is generally a text-based document or an image-based document. A text-based document, such as a computer file, is one that contains digitally encoded (e.g., Unicode) character streams. On the other hand, an image-based document is made up of pixels. In an image-based document, the text content or characters in the document are represented by pixel values. For an image-based document, rendering these pixel values draws the characters, but the correspondence between characters and the pixels or pixel patterns is unknown. Therefore, LI in image-based documents is much more challenging that for text-based documents, at least in part due to the semantic gap between pixel patterns and a language. As a result, LI for image-based documents is complicated and much more resource intensive than LI for text-based documents. Consequently, most existing LI systems or services are designed only for text-based documents.

The present embodiments provide automated solutions for identifying languages for image-based documents. A language identification system is described that provides a complete automated end-to-end solution that uses machine learning-based techniques (e.g., using neural networks including deep neural networks) for automatic language identification tasks. The language identification system uses a trainable neural network model that integrates multiple neural network models in a single unified end-to-end trainable architecture. In certain implementations, multiple different types of neural networks are used. In one implementation, the language identification system uses a ML model that combines a convolutional neural network (CNN) and a recurrent neural network (RNN).

In certain embodiments, given an input image comprising multiple pixels, the language identification system is capable of using the ML model to determine a language corresponding to the characters represented by the pixel values in the input image. In certain implementations, the CNN portion of the ML model used by the language identification system extracts visual features from image pixels in the input image and converts the input image to a sequence of feature vectors along with writing direction. Subsequently, the RNN portion of the ML model used by the language identification system receives the extracted visual features as input and extracts contextual-sequential features for language classification. A classifier (e.g., a text head) is used to identify a language for the input image based upon the outputs of the RNN portion.

In certain implementations, the image that is input to the ML model is an image portion of an image-based document, such as a bounding box extracted from the image-based document. For example, multiple bounding boxes may be extracted from an image-based document, with each bounding box containing an image portion of the contents of the image-based document. In certain implementations, each bounding box image corresponds to a line within the image-based document or a portion of a line. A sampling of the extracted bounding boxes may be taken by the language identification system. The language identification system may then use the ML model to determine a language corresponding to each of the sampled bounding boxes. The language identification system may then determine a language for the image-based document based upon the languages determined for the sampled bounding boxes. In this manner, the language identification system is configured to use the ML model to determine a language for image portions of an image-based document, such as for each of a sampled set of bounding boxes extracted from the image-based document. The language identification system may then determine a language for the image-based document based upon the languages determined for the sampled bounding boxes In certain embodiments, a joint training strategy is used to the train the CNN and RNN portions of the language identification system, where the joint training strategy utilizes both the ground-truth language and auxiliary text labels of each corresponding image. The language identification system is capable of distinguishing different scripts, and of classifying between languages with shared scripts (e.g., English vs Spanish, which share a common script). In certain experimental results based upon certain implementations, a very high accuracy (e.g., 96%) was achieved using the language identification system for language identification for multiple image-based documents.

As described above, in certain embodiments, a joint training strategy is used to the train the CNN and RNN portions of the ML model used by the language identification system, where the joint training strategy utilizes both the ground-truth language and auxiliary text labels of each corresponding image. The training can include designing a loss function that combines both the connectionist temporal classification (CTC) loss (using ground-truth text label) and cross-entropy loss (using ground-truth language label). With joint training, the ML model can distinguish not only scripts but also languages.

The teachings described herein can be used to support many document analysis systems and techniques. For example, a language identification system embodiment described herein can be used in automatic multi-lingual OCR. Multi-lingual OCRs can have specialized models for different languages. With language identification, the system can automatically apply a corresponding model according to the identified language of the document. Another example can include a dominant language detection from image-based documents, enabling many language-specific operations in document management systems.

A. System Architecture

Embodiments of a language identification system perform language identification tasks for images by using a ML model that seamlessly integrates multiple neural networks or multiple types of neural networks in a unified end-to-end trainable architecture. In certain implementations, a CNN is integrated with a RNN. FIG. 1 is block diagram 100 illustrating an example unified end-to-end trainable architecture, according to certain embodiments. In the embodiment depicted in FIG. 1, a CNN and a RNN are configured in a unified end-to-end trainable architecture that can detect a language for an input image.

At 102, an image-based document is received. For example, a document can be electronically scanned to obtain the image-based document at the document processing system 104. The image-based document can include a series of text lines and/or images.

The document processing system 104 can obtain the image-based document and can identify portions of the document comprising text lines. For instance, document processing system 104 can identify pixels in the image-based document comprising text. Each text line can be defined by a bounding box specifying a position of each text line in the document. Examples of identifying bounding boxes in an image-based document is provided in text localization processes 504, 604 as described in FIGS. 5 and 6. The document processing system 104 can provide a text line 106 to a model for deriving a language and/or text content of the text line 106.

As described above, a model 122 can include any of a CNN 108, RNN 110, a language prediction module 112, and/or a text prediction module 116. The model can process a text line 106 to derive a language and/or text content of the text line 106.

The text line 106 can be processed using the CNN 108. The CNN 108 can extract visual features from the text line 106. For example, the input to the CNN 108 can include a set of pixels representing a line, where the line may include characters and is bounded by a bounding box. The extracted visual features can include parameters relating to a script type (e.g., Latin-based script, Chinese script) of each character in the text line 106, a structure of characters in the text line 106, etc. In certain embodiments, for an input image, the CNN 108 can produce a feature map of height 1, which can be treated as a sequence along the writing direction.

The RNN 110 can obtain the extracted visual features from the CNN 108 and derive contextual features from the visual feature sequence. The contextual features can provide defined parameters relating to a language and/or text of a text line 106. For example, for a Latin-based script, the contextual features can identify one or more characters/symbols unique to a portion of Latin-based languages. For instance, identifying an umlaut (Ü) can be indicative of the language more likely comprising a German language. The contextual features can be fed into any of a language prediction module 112 and/or a text prediction module 116 for predicting a language and/or text content of a text line 106.

The language prediction module 112 (or "language head") can predict a language (e.g., predicted language 114) of a text line 106 using contextual features derived from the RNN 110. The language prediction module 112 can identify similarities between the contextual features and the text line 106 with known characteristics of various languages. The identified similarities can be used to derive a correlation between the text line 106 and one or more languages. The language prediction module 112 can further derive a correlation metric specifying a confidence in the text line as corresponding with each language.

The text prediction module 116 (or "text head") can predict text content (e.g., predicted text 118) for the text line 106. For example, the text prediction module 116 can process the contextual features derived by RNN 110 to identify characters in the text line 106. The text prediction module 116 can be connected to the output of a middle layer (e.g., the second layer of a Bi-LSTM stack) of the RNN.

In some instances, both the predicted language 114 and predicted text 118 can be fed to a joint training module 120 for training the model. The joint training module 120 can compare the predicted language 114 and predicted text 118 with a known language/text for the text line 106 to train the model. In some instances, a cross-entropy (CE) loss is calculated from predicted language 114 and ground-truth label to train the model. Further, the CTC loss can be calculated from the predicted text 118 and ground-truth text label. The weighted sum of the two losses can be used by the joint training module 120 to optimize the model.

B. Language Prediction Using a Model

Figure 2:
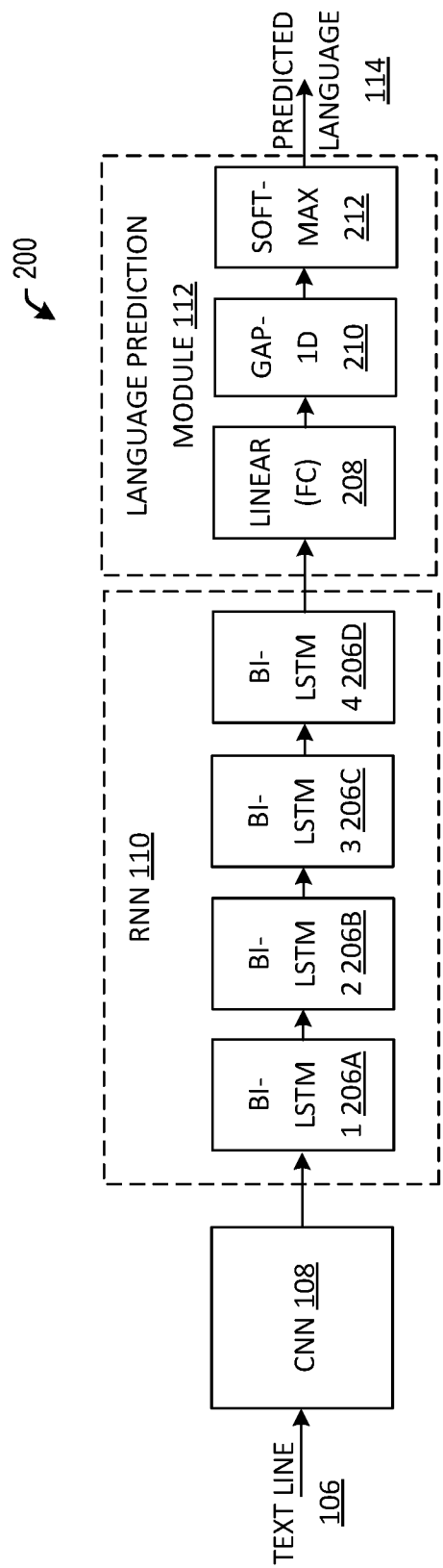
FIG. 2 is a block diagram of an example architecture of a model for predicting a language of a text line, according to certain embodiments.

As described above, a model can be utilized to process a text line from an image-based document and predict a language of the text line. FIG. 2 is a block diagram 200 of an example architecture of a model for predicting a language of a text line, according to certain embodiments.

The model depicted in FIG. 2 can focus on language identification from a text line. Each text line can include a sub-image cropped from a document image using a corresponding line bounding box. Line bounding boxes can be a result of text detection/localization methods. The image area contained in the bounding box can be cropped and resized to have a fixed height. A height of each text line can be normalized to 22 pixels. Moreover, the color-space of input images can be normalized into gray scale. Pixel values can also be normalized in the range [−1, 1]. The model can denote the $i^{th}$ input text line image.

As shown in FIG. 2, the text line 106 can be provided to a CNN 108. The CNN 108 can derive visual features of the text line 106. For example, the visual features can broadly define features of the characters in the text line or a script type of the text in the text line. The visual features can then be passed to the RNN 110.

Various CNN architectures can be used, the CNN type can depend on the memory and computation requirements of the actual application. The CNN architecture can be designed with a selection of convolutional strides and pooling layers so that height is reduced from input 22 to 1, or we can add a global pooling layer as the last layer of the CNN. Since the height of the feature map is 1, corresponding dimensions (i.e., y-axis) can be squeezed and treat the feature map as a sequence along the writing direction (i.e., x-axis).

In certain embodiments, a shape of each text line is modified as the text line is processed by the model. For example, the shape can include a height of 1 and a depth of 32. In this example, after processing the text line by the CNN, the shape of the text line can include a length of 512, and a width of 1. Further, the shape can be modified as the other portions of the model process the text line.

The RNN 110 can include a stack of Bi-Directional Long Short Term Memory (Bi-LSTM) layers (e.g., 206A-D). The stack of Bi-LSTM layers 206A-D can process the visual features of the text line and derive contextual features of the text line. For example, the contextual features can more specifically define features of the characters in the text line. The contextual features can be used to predict a language in the model.

The contextual features can be forwarded to a language prediction module 112 for predicting a language of the text line. The language prediction module 112 can include any of a linear layer 208, a 1-D global average pooling (GAP) layer 210, and a soft-max activation layer 212. A linear classification layer (a.k.a. fully connected layer) can calculate classification logits for the prediction. To make the final prediction, the model can summarize the logits using a 1-D global average pooling (GAP) layer and convert it to the probability distribution. The language prediction module 112 can provide a predicted language 114 and/or a confidence level specifying a confidence of the predicted language comprising the language of the text line.

C. Joint Training of a Model Using Predicted Language and Text

Figure 3:
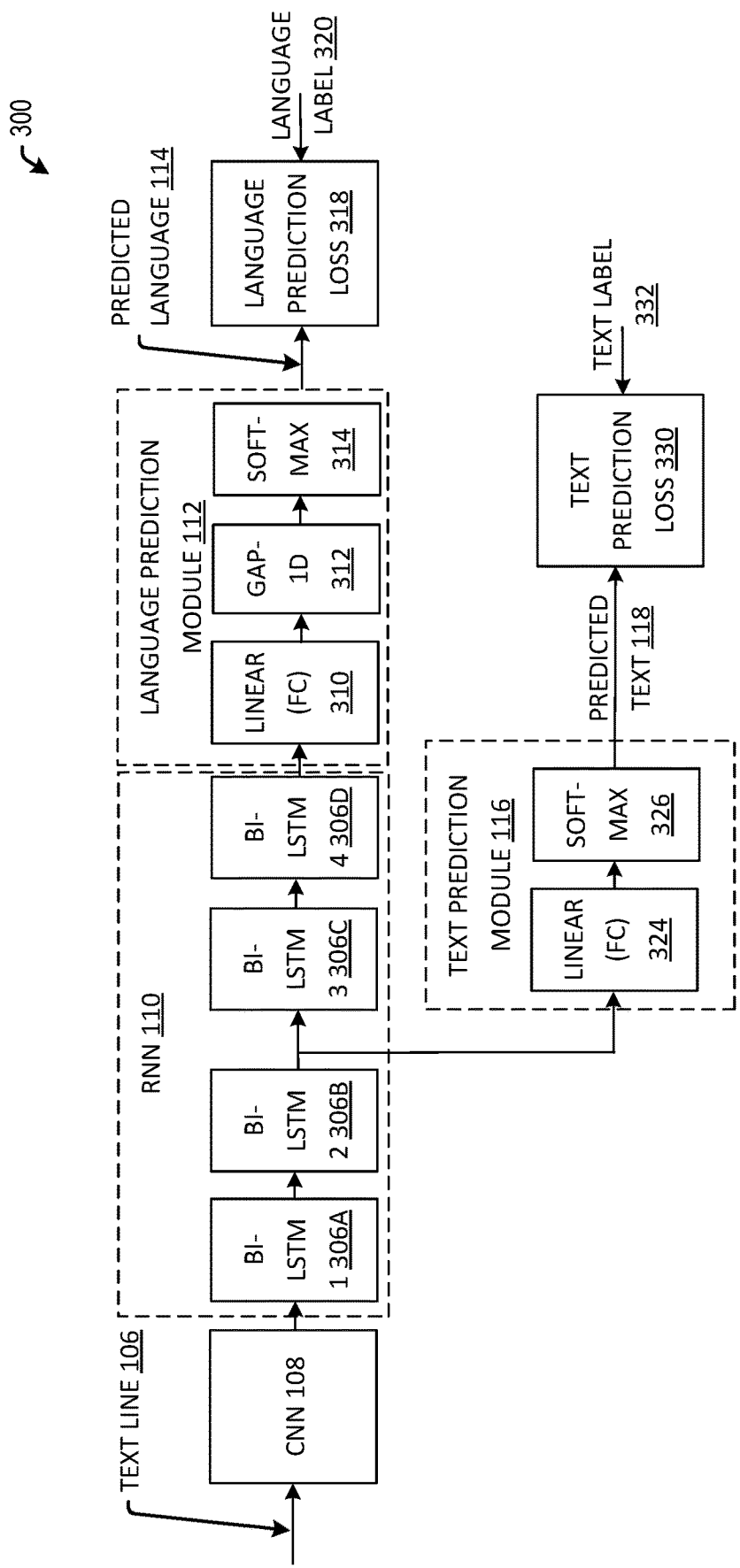
FIG. 3 is a block diagram illustrating an architecture for joint training of a machine learning model comprising a CNN and an RNN for identifying language and text in an image-based document according to certain embodiments.

FIG. 3 is a block diagram 300 illustrating an architecture for joint training of a machine learning model comprising a CNN and an RNN for identifying language and text in an image-based document according to certain embodiments. To better train the model, the model can include an auxiliary text head, which is another FC layer, and connected to the output of a middle layer (the second layer of the Bi-LSTM stack) of the RNN. The auxiliary text head can predict the text corresponding to an input text line from the image-based document.

As part of the joint training processing, a cross-entropy (CE) loss can be calculated from predicted language and ground-truth label to train the model. Moreover, an auxiliary text head is added that contains a linear layer and a soft-max activation layer. The text head can be connected with the output of the second Bi-LSTM. The CTC loss can be calculated from the predicted text (output of the text head) and ground-truth text label. The weighted sum of the two losses can be used to optimize the model.

Figure 4:
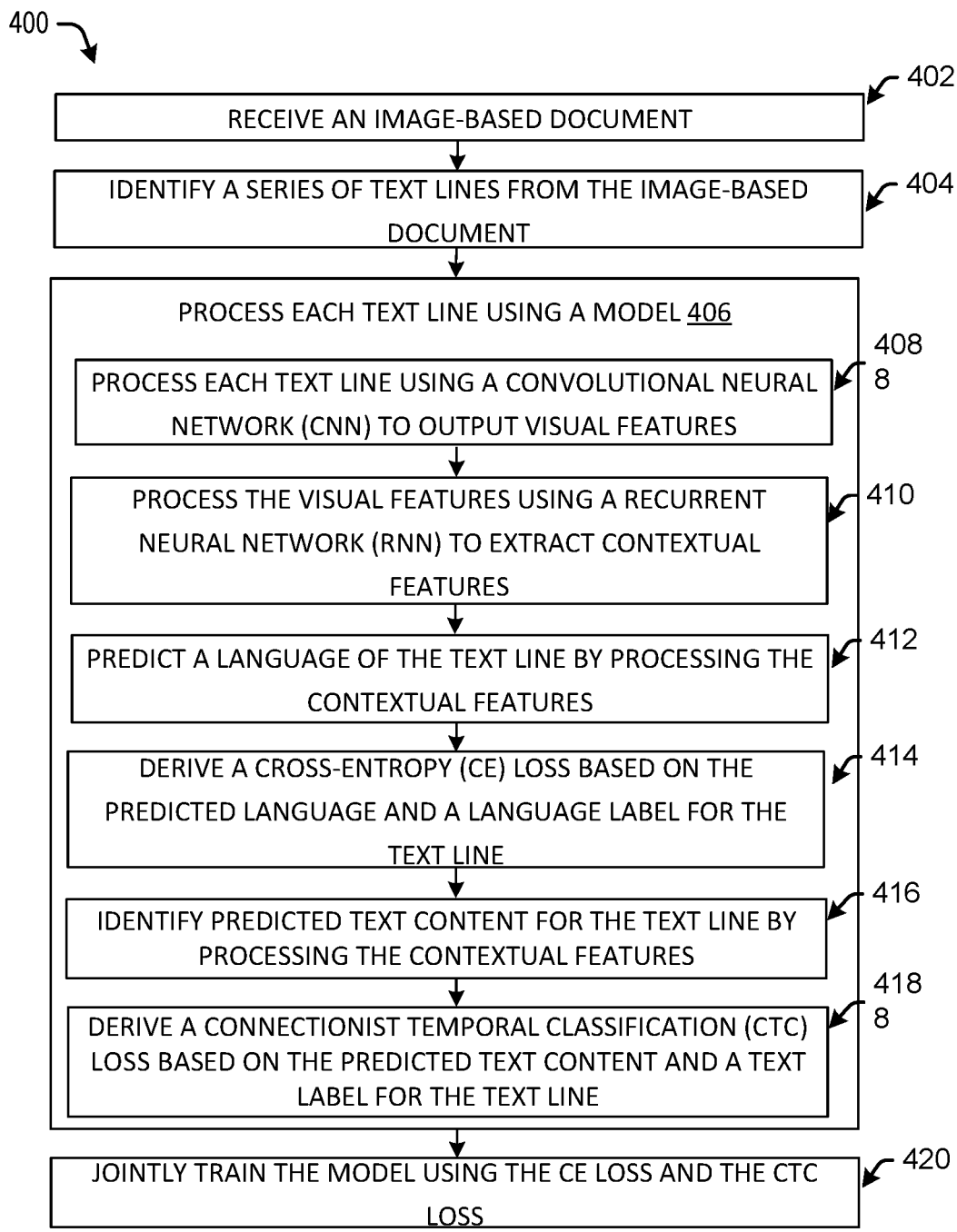
FIG. 4 provides a flow diagram of an example method for identifying a language and text included in an image-based document using a model, according to certain embodiments.

D. Example Method for Identifying a Language and Text Using a Model and Joint Training of the Model FIG. 4 provides a flow diagram 400 of an example method for identifying a language and text included in an image-based document using a model, according to certain embodiments.

At 402, the method can include receiving an image-based document. As an example, an image-based document can be received responsive to electronically scanning a document or receiving the image-based document from another computing node. The image-based document can include a number of text lines, where each text line can be bounded by a bounding box. A document processing system 104 as described herein can obtain the image-based document and identify text lines in the document.

At 404, the method can include identifying a series of text lines from the image-based document. For example, the document processing system 104 can define regions in the image-based document with text, where each text line is bounded by a bounding box specifying a position of each text line in the document. Each text line can be fed to the model for processing as described herein.

At 406, the method can include executing a model to perform a vision-based language identification and text identification process. The model (e.g., model 122) can implement an end-to-end language and text identification process as described herein.

At 408, executing the model can include processing each text line using a convolutional neural network (CNN) (e.g., CNN 108) to output visual features from the image-based document. The visual features can include portions of the document comprising text, character features, positions of the text in the document, etc. The visual features can be fed to a RNN (e.g., RNN 110) to extract other features of the image-based document.

At 410, executing the model can include processing the visual features using a recurrent neural network (RNN) to extract contextual features. The contextual features can provide insights into the characters and words in the text lines. The contextual features can be used to identify a language and text as described herein. The RNN can include a series of Bi-Directional Long Short Term Memory (Bi-LSTM) layers.

At 412, executing the model can include predicting a language of each text line by processing the contextual features. For instance, a language prediction module 112 can compare the script details in the contextual features with a series of known languages to derive a language of the text in each text line. In some instances, a number of potential languages can be identified and associated with a confidence level specifying a confidence of each potential language being a language of the text in each text line.

At 414, executing the model can include deriving a cross-entropy (CE) loss based on the predicted language and a language label (e.g., 320) for the text line. The CE loss can be used to train the model to identify languages in various text inputs in image-based documents. The language prediction module 112 can include any of a linear layer, a one-dimensional global average pooling (GAP) layer, and a soft-max activation layer.

At 416, executing the model can include identifying a predicted text content of the text line by processing the contextual features. The text prediction module 116 can predict the text content of a text line and/or derive text labels from the contextual features.

At 418, executing the model can include deriving a connectionist temporal classification (CTC) loss based on the predicted text content and the text label. The CE loss and the CTC loss can be used for training the model as described herein.

At 420, the method can include jointly training the model using the CE loss and the CTC loss. A joint training module 120 can generate training data for training of the model 122. For example, a weighted sum of the CE loss and CTC loss can be generated and used to increase accuracy in identifying language/text in text lines.

E. Use Case Examples

1. Multi-Lingual OCR

Figure 5:
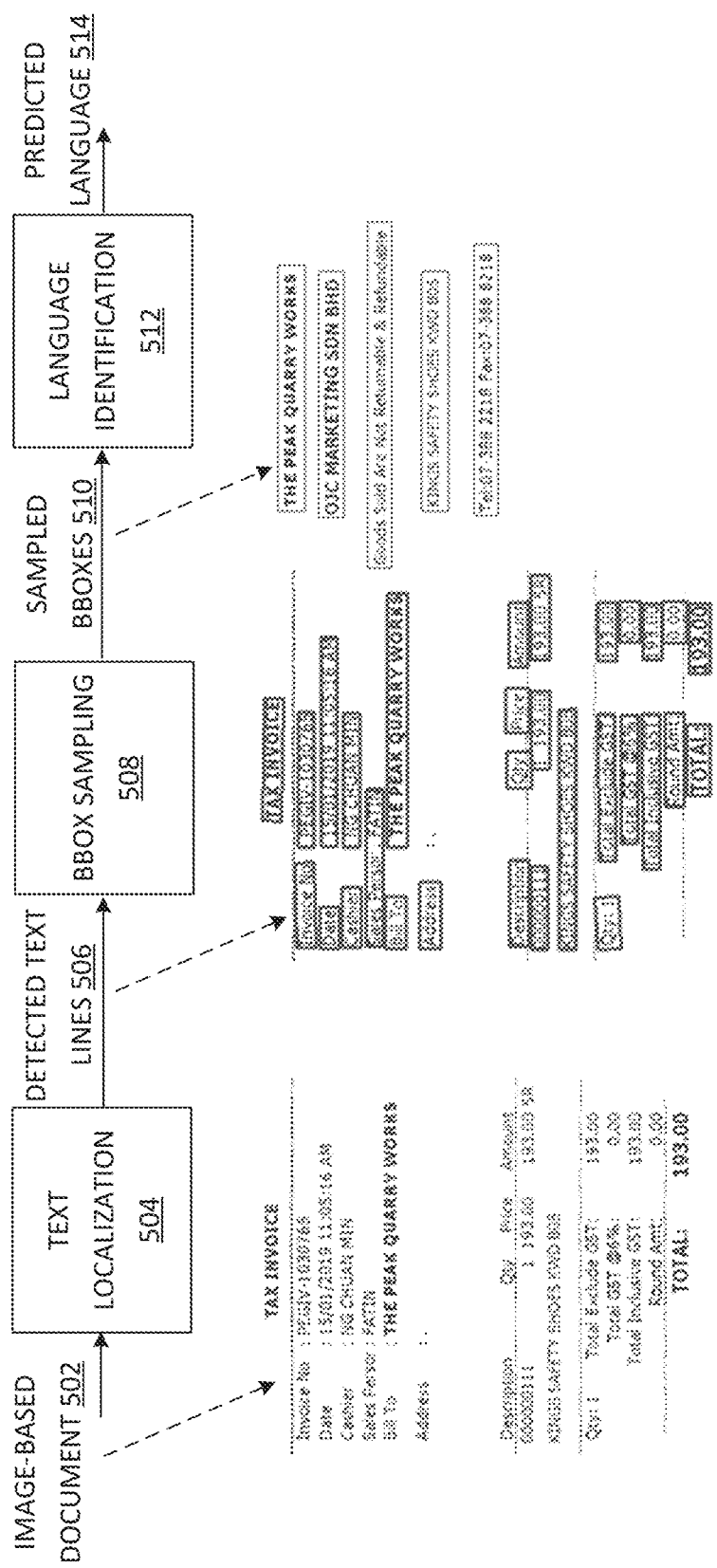
FIG. 5 is a block diagram illustrating an example multilingual OCR process with automatic language identification, according to certain embodiments.

The language identification process as described herein can be applied to multiple use cases such as for multi-lingual optical character recognition (OCR), as shown in FIG. 5. FIG. 5 is a block diagram 500 illustrating an example multi-lingual OCR process with automatic language identification, according to certain embodiments.

The embodiment depicted in FIG. 5 illustrates a multi-lingual OCR system that includes a text localization module and multiple text recognition modules, each of which can serve for one language. The text localization module can detect text lines from the input image-based document as bounding boxes (bbox).

As shown in FIG. 5, an image-based document (e.g., a tax invoice document) can be obtained. A document processing system 104 as described herein can process the image-based document and identify a series of text lines (e.g., detected text lines 506) using a text localization process 504. The language localization process can include transcribing pixels inside each bbox to text characters. The combined CNN-RNN model, as described herein, can automatically classify the language of the text content inside each bbox, and then dispatch the subsequent text recognition task for that bounding box to the corresponding text recognition model. Without the automated language identification performed by the language identification system, someone may have to manually specify the language of the image-based document and further assume that all the bounding boxes extracted from the image-based document contain the same specified language.

The document processing system 104 can further sample bboxes (e.g., 508) to derive a set of sampled bboxes (e.g., sample bboxes 510). For example, five text lines can be sampled from the image-based document based on various parameters, such as the length of the bbox (indicative of an amount of text in each text line). Each of the sampled bboxes 510 can be processed in a language identification process 512 (e.g., using the model 122) to generate a predicted language 514 as described herein.

2. Dominant Language Detection in Scanned Documents

Figure 6:
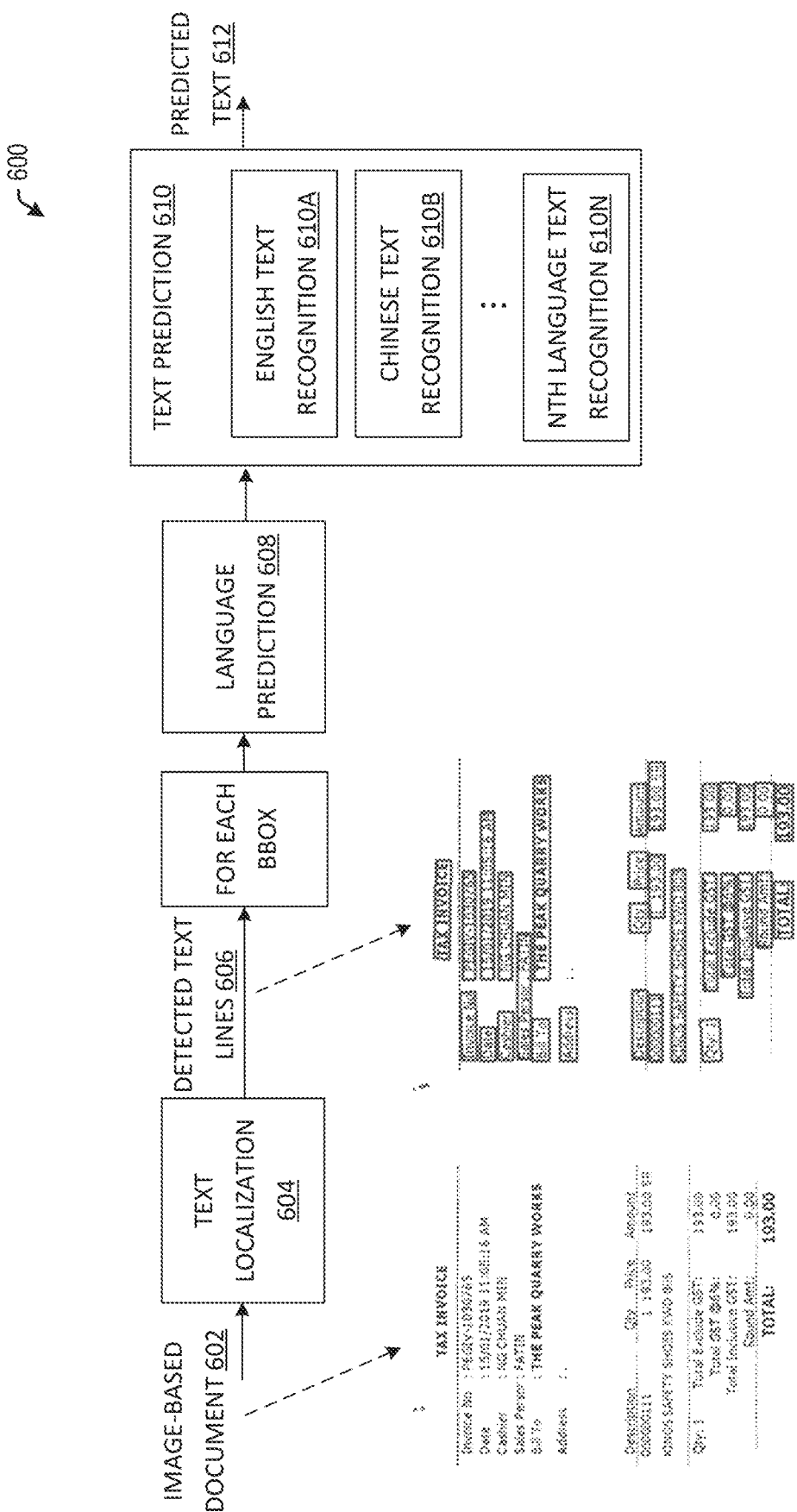
FIG. 6 is a block diagram illustrating a dominant language detection system example, according to certain embodiments.

Certain embodiments of the language identification system described herein can be used to detect the dominant language in an image-based document. FIG. 6 is a block diagram 600 illustrating a dominant language detection system example, according to certain embodiments.

As shown in FIG. 6, the model can detect and sample bboxes (e.g., detected text lines 606) from the input image-based document 602. For example, a text localization process 604 can include extracting bboxes from the image-based document 602.

Further, as shown in FIG. 6, for each bbox, a language prediction process 608 can be implemented. The model (e.g., 122) can determine a language for each bbox image. Further, a text prediction process 610 can be implemented to derive predicted text for each bbox. For example, data relating to each bbox can be processed using text recognition modules for a number of languages (e.g., English text recognition 610A, Chinese text recognition 610B, Nth Language text recognition 610N). The text prediction process 610 can derive predicted text 612 for each bbox.

Results from each bbox (e.g., predicted text 612 for each bbox) can be fused together to output the dominant language for the image-based document itself. For example, from among the sampled bboxes and languages determined for the bboxes using the CNN-RNN model, the language with the highest count may be identified as the primary or dominant language for the image-based document. The language with the second highest count may be identified as the secondary language for the image-based document, and so on. Various different techniques may be used to fuse the languages determined for the bboxes into determining a primary language for the image-based document. Accordingly, the various embodiments described herein may be used to find a language at the bbox level, and also a language for the image-based document.

F. IAAS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In certain implementations, the language identification system described herein may be implemented in a cloud environment provided by a cloud services provider (CSP). For example, the language identification functions may be provided as cloud services. In certain implementations, the services may be provided as part of IaaS services provided by the CSP. FIGS. 7, 8, 9, and 10 and the accompanying description shown below describes IaaS implementations that may be used to provide language identification services according to certain embodiments. FIG. 11 depicts a computer system that may be used to implement a language identification system described herein according to certain embodiments. One or multiple computer systems, such as the one depicted in FIG. 11 may be used to implement a language identification system.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need (or, alternatively, be desired/expected) to be set up. In some instances, the provisioning can be done manually, a provisioning tool may be utilized to provision the resources, and/or deployment tools may be utilized to deploy the code once the infrastructure is provisioned.

Figure 7:
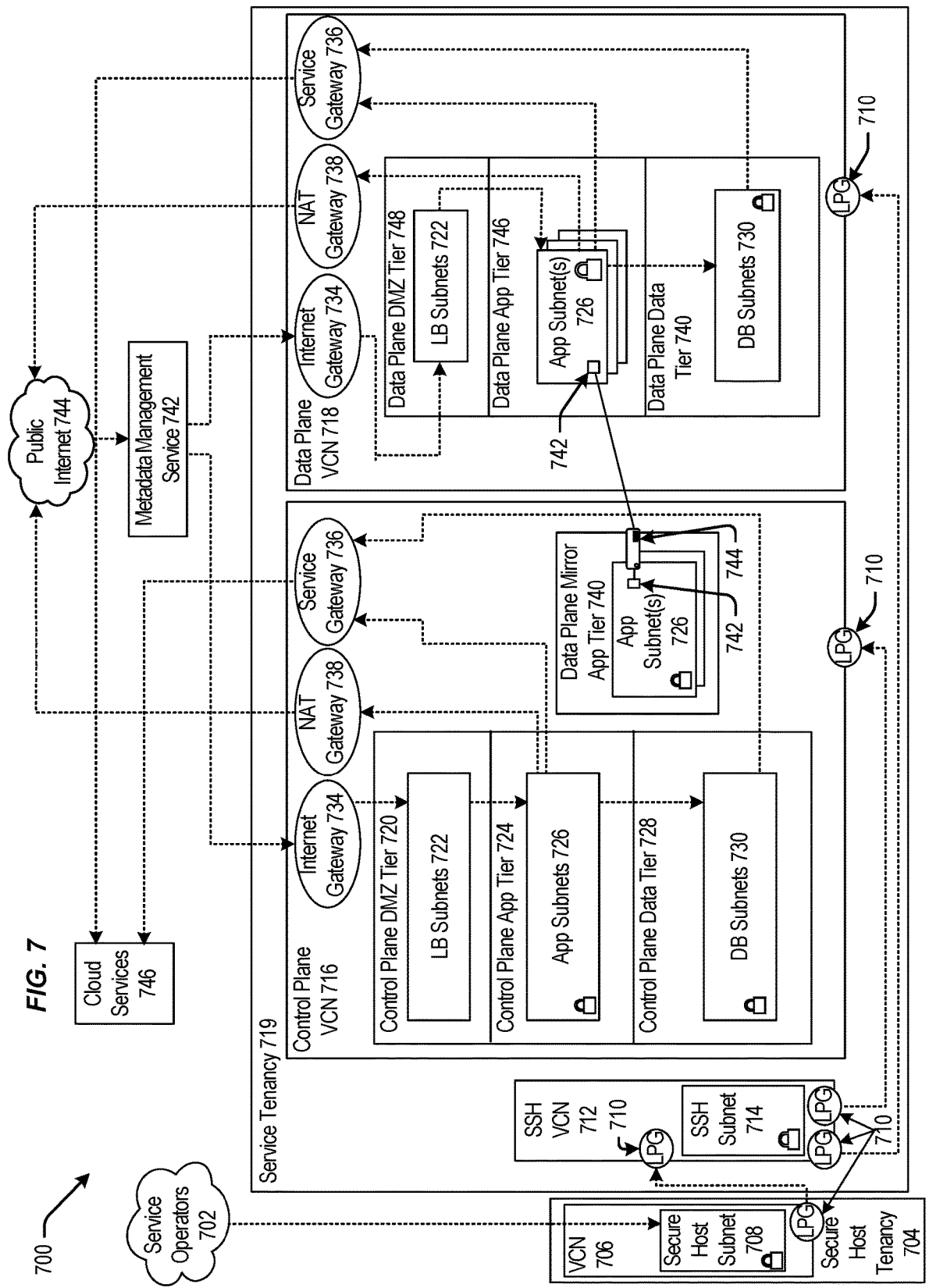
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
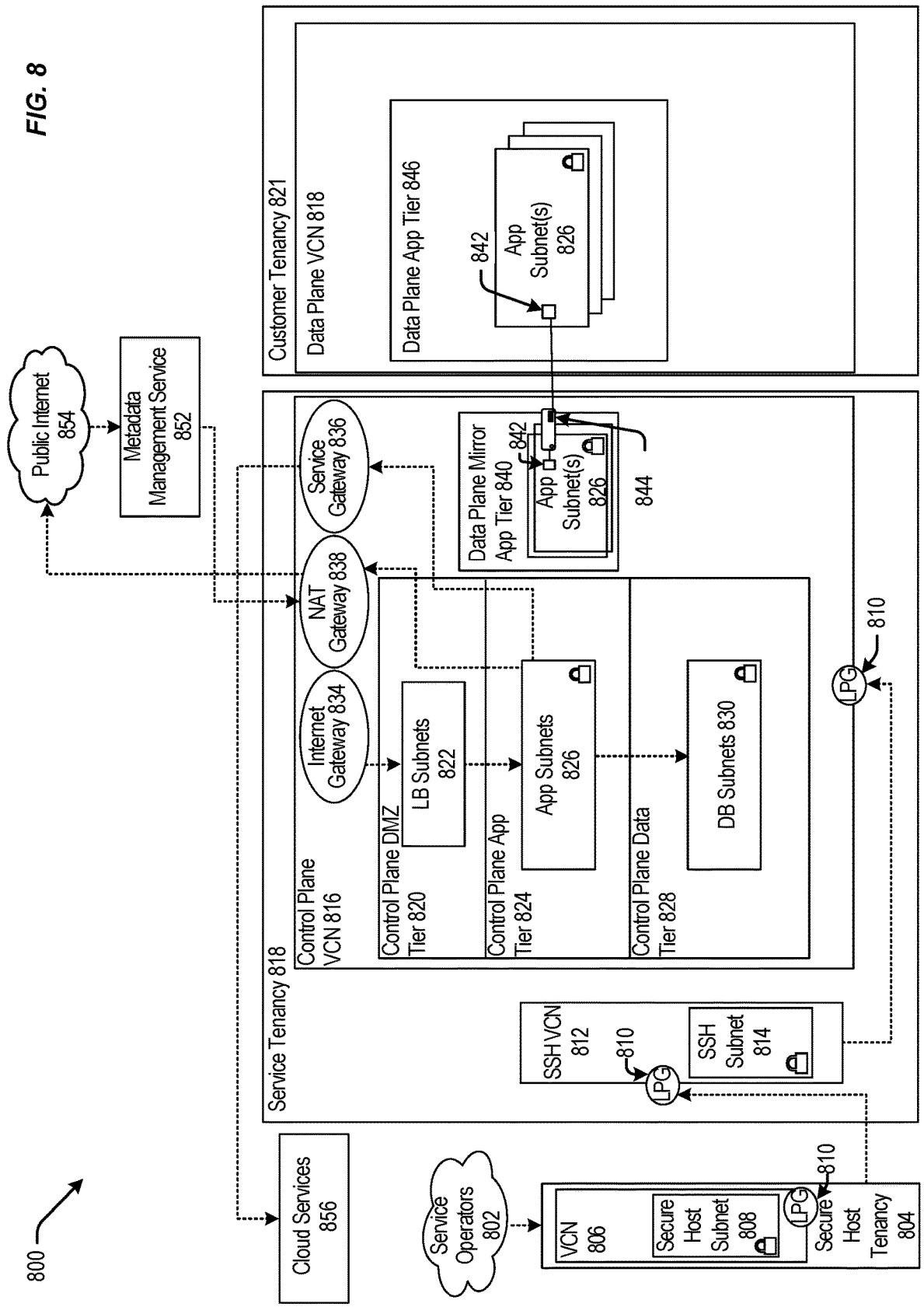
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG.

7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
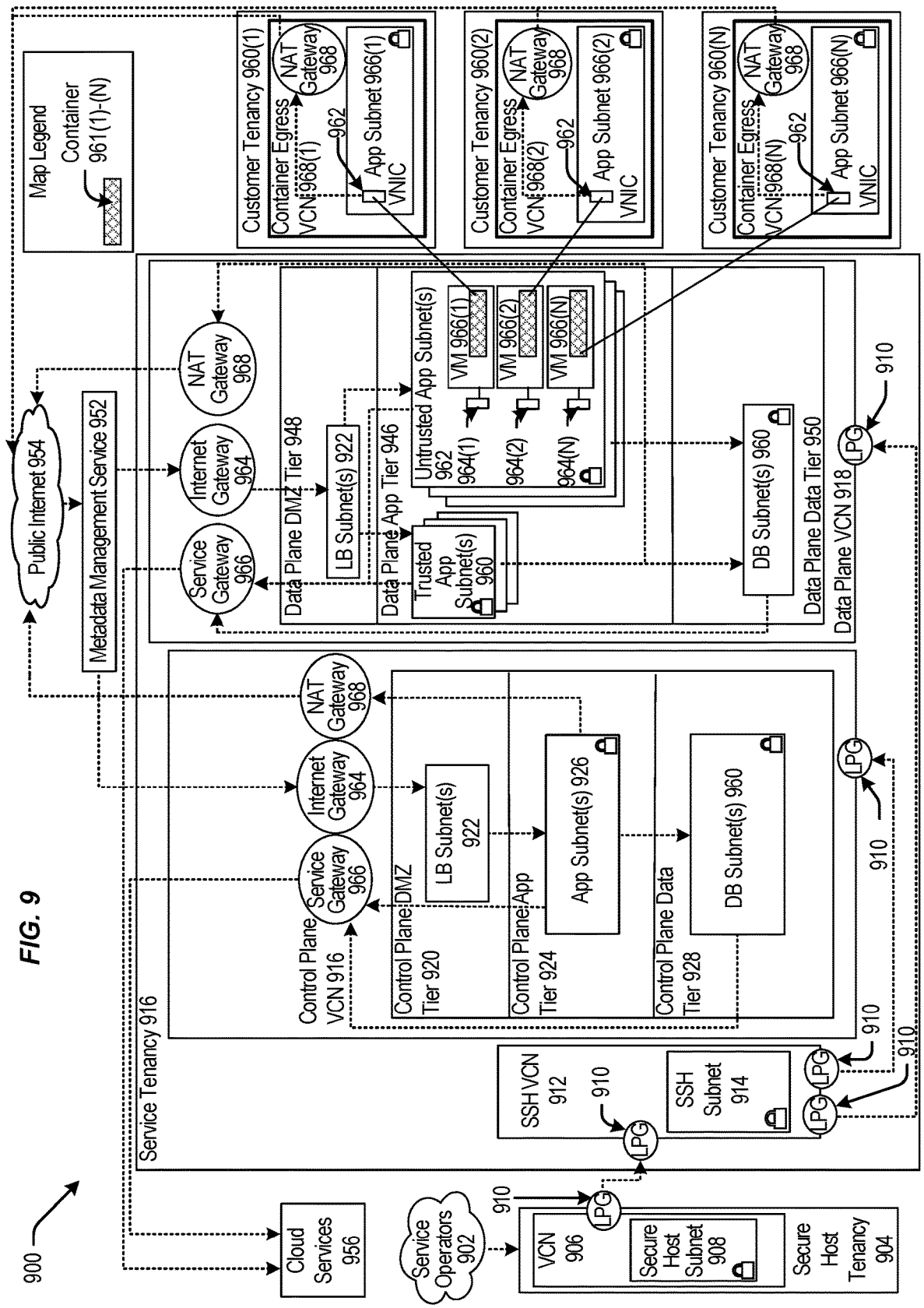
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g.

the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
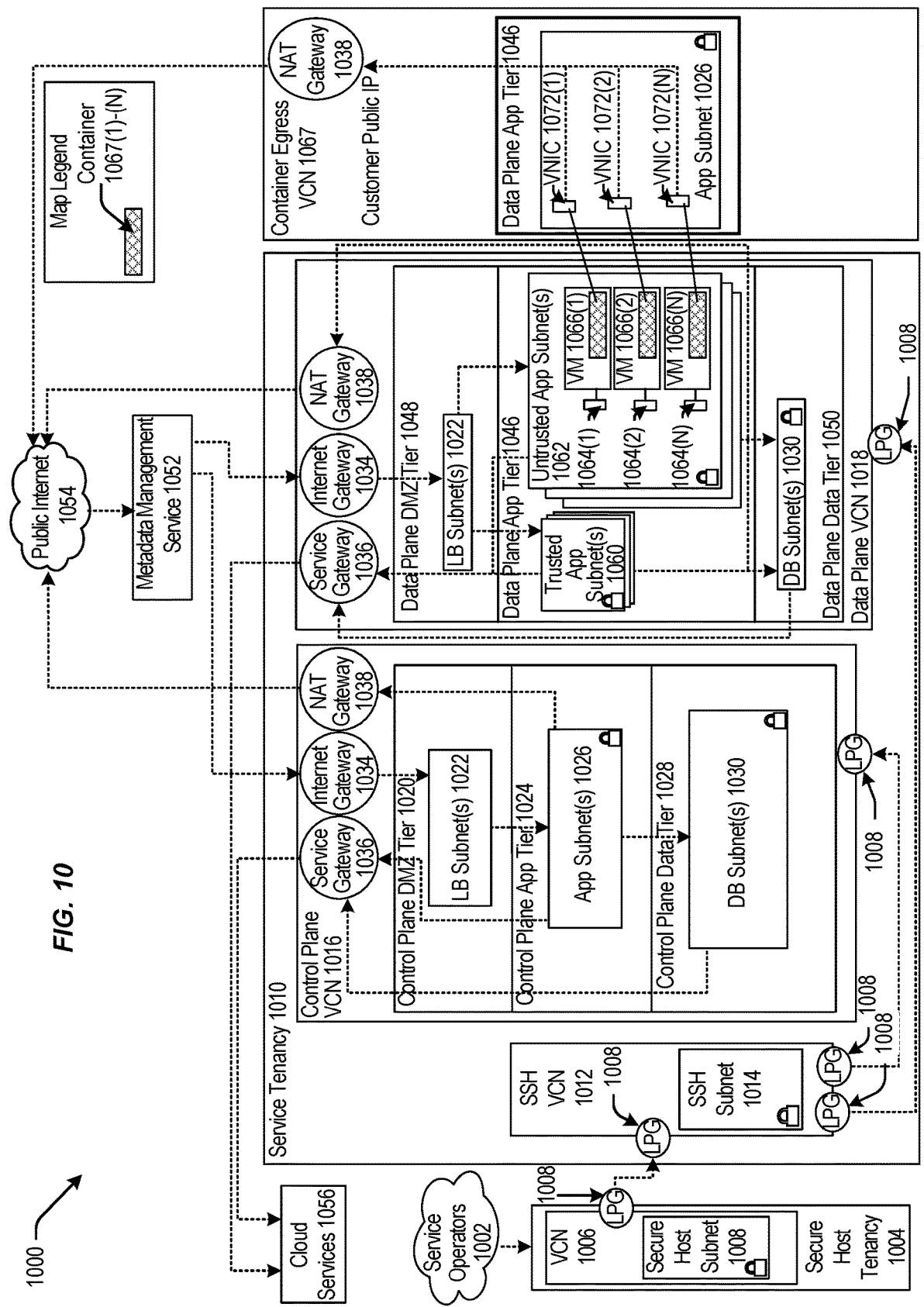
FIG. 10 is a block diagram illustrating another pattern for implementing a cloud infrastructure as a service system, according to at least one embodiment.
Figure 11:
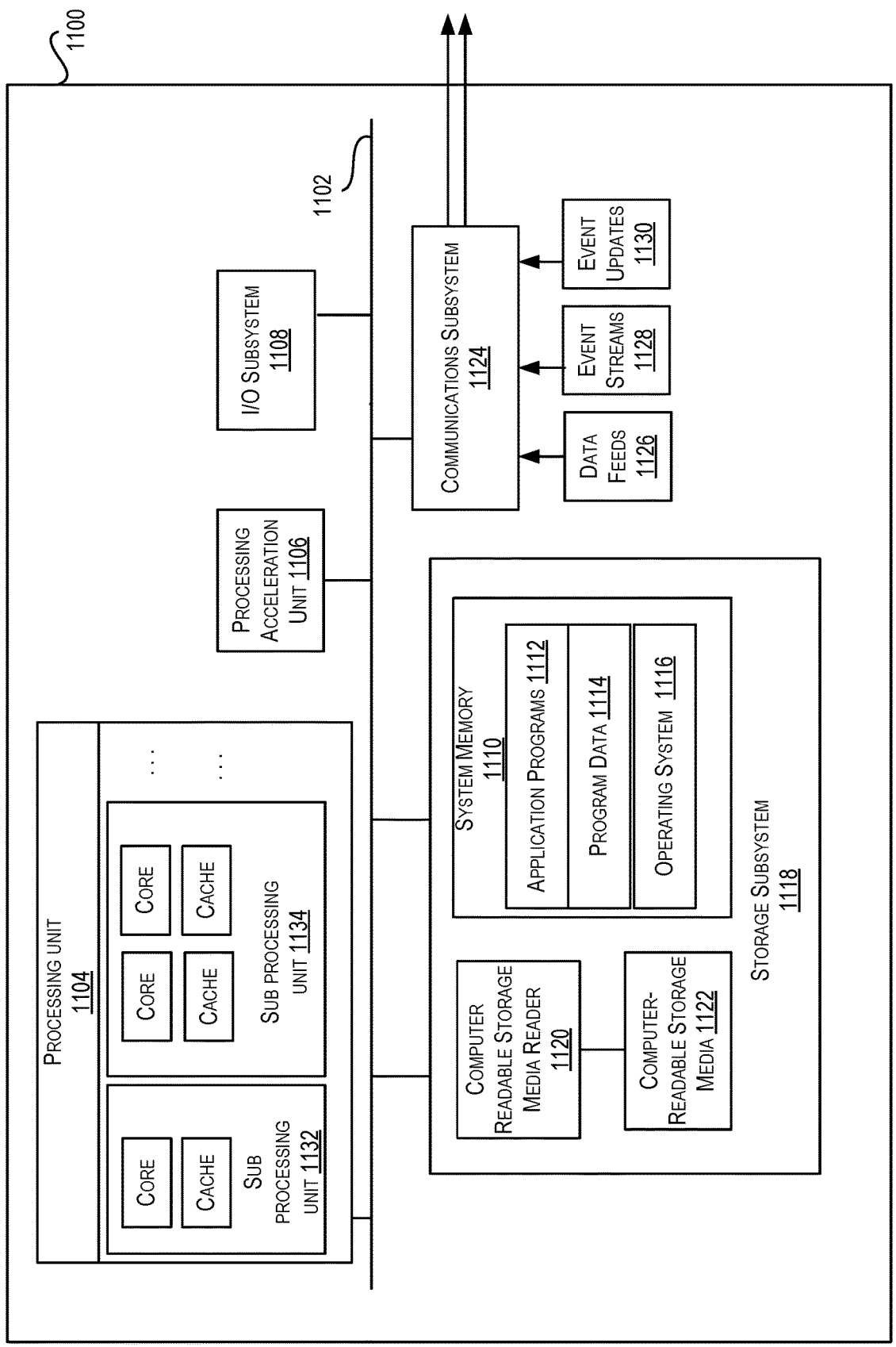
FIG. 11 is a block diagram illustrating an example computer system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A computer-implemented method comprising:
training a model using one or more image-based documents to generate a trained model, wherein the training comprises:
for each text line of multiple text lines included in a first image-based document in the one or more image-based documents:
processing the text line using a convolutional neural network (CNN) to derive visual features from the text line,
processing the visual features using a recurrent neural network (RNN) to extract contextual features of the text line,
predicting a predicted language of the text line by processing the contextual features of the text line,
deriving a language prediction loss based on a comparison between the predicted language and a known language of the text line,
predicting a predicted set of text for the text line,
deriving a text prediction loss based on a difference between the predicted set of text for the text line and known text for the text line, and
training the model using the language prediction loss and the text prediction loss.

2. The method of claim 1, wherein the training further comprises:
for each text line included in the first image-based document, performing a text localization process to identify the text line in the first image-based document, wherein the text line is bounded by a bounding box specifying a position of the text line in the first image-based document.

3. The method of claim 1, wherein the training further comprises:
deriving a predicted language for the first image-based document based upon the predicted language of each text line of the multiple text lines in the first image-based document.

4. The method of claim 1, wherein the RNN includes a series of Bi-Directional Long Short Term Memory (Bi-LSTM) layers.

5. The method of claim 1, wherein predicting the predicted language is performed using a linear layer, a one-dimensional global average pooling (GAP) layer, and a soft-max activation layer.

6. The method of claim 1, wherein the language prediction loss comprises a cross-entropy (CE) loss.

7. The method of claim 1, wherein the text prediction loss is a connectionist temporal classification (CTC) loss.

8. The method of claim 1, wherein the training further comprises:
jointly training the CNN and the RNN using both the language prediction loss and the text prediction loss.

9. The method of claim 1, further comprising:
receiving a particular image-based document; and
using the trained model to predict a language for the particular image-based document.

10. A cloud infrastructure node comprising:
one or more processors; and
a non-transitory computer-readable medium including instructions that, when executed by the one or more processors, cause the one or more processors to:
receive an image-based document including multiple text lines;
perform a text localization process to identify each of the multiple text lines in the image-based document, wherein each of the multiple text lines is bounded by a bounding box specifying a position of the text line in the image-based document;
process each text line of the multiple text lines using a convolutional neural network (CNN) of a model to derive visual features from the text line;
for each text line of the multiple text lines, process the derived visual features for the text line using a recurrent neural network (RNN) of the model to extract contextual features of the text line;
predict a predicted language of each text line by processing the contextual features of the text line;
derive, based at least in part on the predicted language for each text line of the multiple text lines, a predicted language for the image-based document.

11. The cloud infrastructure node of claim 10, wherein the RNN includes a series of Bi-Directional Long Short Term Memory (Bi-LSTM) layers.

12. The cloud infrastructure node of claim 10, wherein predicting the predicted language is performed using a linear layer, a one-dimensional global average pooling (GAP) layer, and a soft-max activation layer.

13. The cloud infrastructure node of claim 10, wherein the non-transitory computer-readable medium further includes instructions that, when executed by the one or more processors, cause the one or more processors to:
derive, for each of the multiple text lines, a cross-entropy (CE) loss based on a comparison between the predicted language and a known language of each text line.

14. The cloud infrastructure node of claim 13, wherein the non-transitory computer-readable medium further includes instructions that, when executed by the one or more processors, cause the one or more processors to:
predict a predicted set of text for at least one text line from the multiple text lines; and
derive a connectionist temporal classification (CTC) loss based on a difference between the predicted set of text for the at least one text line and known text for the at least one text line.

15. The cloud infrastructure node of claim 14, wherein the non-transitory computer-readable medium further includes instructions that, when executed by the one or more processors, cause the one or more processors to:
jointly train the CNN and the RNN of the model using both the CE loss and the CTC loss.

16. A non-transitory computer-readable medium having stored thereon a sequence of instructions which, when executed by one or more processors, causes the one or more processors to execute a process comprising:
receiving an image-based document including multiple text lines;
executing, for each text line included in the image-based document, a model to perform a language and text prediction process, wherein executing the model includes:
processing the text line using a convolutional neural network (CNN) to derive visual features from the text line,
processing the visual features using a recurrent neural network (RNN) to extract contextual features of the text line,
predicting a predicted language of the text line by processing the contextual features of the text line,
deriving a cross-entropy (CE) loss based on a comparison between the predicted language and a known language of the text line,
predicting a predicted set of text for the text line, and
deriving a connectionist temporal classification (CTC) loss based on a difference between the predicted set of text for the text line and known text for the text line.

17. The non-transitory computer-readable medium of claim 16, wherein the process further comprises:
performing a text localization process to identify each of the multiple text lines in the image-based document, wherein each of the multiple text lines is bounded by a bounding box specifying a position of the text line in the image-based document.

18. The non-transitory computer-readable medium of claim 16, wherein the process further comprises:
aggregating predicted languages for the multiple text lines to derive a predicted language for the image-based document.

19. The non-transitory computer-readable medium of claim 16, wherein the RNN includes a series of Bi-Directional Long Short Term Memory (Bi-LSTM) layers.

20. The non-transitory computer-readable medium of claim 16, wherein the process further comprises:
jointly training the CNN and the RNN using both the CE loss and CTC loss.

* * * * *

UNITED STATES PATENT AND TRADEMARK OFFICE
CERTIFICATE OF CORRECTION

PATENT NO. : 12,249,170 B2  
APPLICATION NO. : 17/897055  
DATED : March 11, 2025  
INVENTOR(S) : Gong et al.

Page 1 of 1

It is certified that error appears in the above-identified patent and that said Letters Patent is hereby corrected as shown below:

In the Specification

In Column 3, Line 39, delete "s" and insert -- is --, therefor.

In Column 3, Line 44, After "or" insert -- more --, therefor.

In Column 4, Line 59, delete "boxes" and insert -- boxes. --, therefor.

In the Claims

In Column 27, Line 32, In Claim 10, after "line;" insert -- and --, therefor.

Signed and Sealed this  
Third Day of June, 2025

Coke Morgan Stewart  
*Acting Director of the United States Patent and Trademark Office*